United States Patent
Nicolas

[15] 3,662,773
[45] May 16, 1972

[54] MIXER ASSEMBLIES

[72] Inventor: Jean-Pierre Nicolas, La Chiquita-Gairout Superior -06/, Nice, France

[22] Filed: May 27, 1970

[21] Appl. No.: 40,971

[30] Foreign Application Priority Data

May 27, 1969  France...............................6917254
             France...............................6945390

[52] U.S. Cl............................................137/100, 137/111
[51] Int. Cl. ...........................................G05d 11/00
[58] Field of Search................137/87, 98, 99, 100, 111, 114, 137/109, 505.43

[56] References Cited

UNITED STATES PATENTS

| | | | |
|---|---|---|---|
| 3,250,288 | 5/1966 | Hammon | 137/116.3 |
| 2,760,510 | 8/1956 | Trethewey | 137/99 |
| 2,883,996 | 4/1959 | Blewett et al. | 137/100 |
| 3,116,748 | 1/1964 | Wasson | 137/98 |
| 3,508,567 | 4/1970 | Kirk et al. | 137/98 |

FOREIGN PATENTS OR APPLICATIONS

| | | | |
|---|---|---|---|
| 342,496 | 9/1918 | Germany | 137/87 |
| 325,753 | 2/1930 | Great Britain | 137/98 |

*Primary Examiner*—M. Cary Nelson
*Assistant Examiner*—David J. Zobkiw
*Attorney*—Breitenfeld & Levine

[57] ABSTRACT

A mixer assembly for mixing two expanded and separate fluids under pressure. The assembly operates to maintain the relationship between the pressures of the two expanded fluids substantially constant and also to deliver the mixed fluids at a substantially constant pressure. The assembly comprises a pair of escape valves each having an inlet for one of said fluids. The closure members of these valves are associated with membranees and are operatively interconnected by means such as a beam which permits the valve members to be displaced in relatively opposed directions when the supply pressure of the two fluids vary. The beam or other form of connecting means is acted upon by a resilient element which is compressed or expanded when the supply pressures of the two fluids respectively increase or decrease thus moving the beam in the direction to close or open the escape valves thereby stabilizing the fluids pressures.

7 Claims, 4 Drawing Figures

Patented May 16, 1972 3,662,773

INVENTOR:
JEAN-PIERRE NICOLAS
By
Breitenfeld & Levine
ATTORNEYS

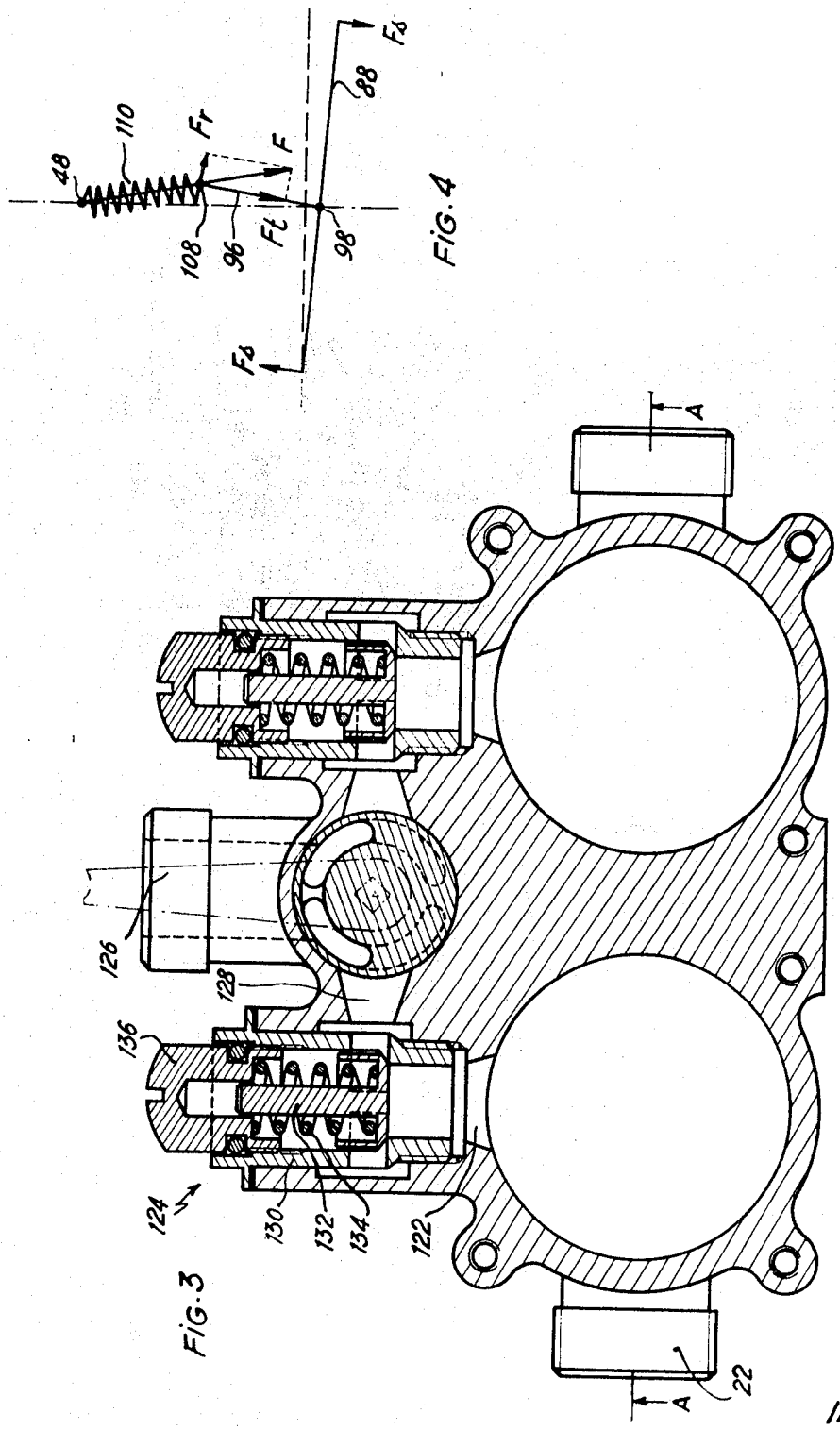

MIXER ASSEMBLIES

The invention relates to mixer assemblies for mixing after expansion two separate fluids under pressure, in particular for supplying sanitary apparatus with more or less hot water.

Mixer assemblies are known in which a variation in pressure of one of the fluids produces a modification in the regulation of the escape valve for the other fluid. These apparatus work as pressure balancing devices, i.e., the relationship between the pressures of the two expanded fluids is maintained substantially constant.

An object of the present invention is to provide a mixer assembly which operates not only as a pressure balancing device but also as a pressure stabilizing device delivering a mixed fluid at a substantially constant pressure.

Another object of the invention is to provide a mixer assembly which ensures the complete and instantaneous stoppage of the flow of one of the fluids when the pressure of the other fluid becomes zero.

In order to achieve these objects the invention provides mixer assemblies with double escape valves comprising two escape valves with axis parallel membranes each comprising a valve poppet having a valve member integral with a membrane placed downstream of the valve in the direction of flow of each fluid, a chamber for mixing the expanded fluids incorporated in the assembly or arranged at a slight distance therefrom, and connecting means between the two valve members permitting the displacement of said members in the opposite direction when the supply pressures of the two fluids vary in the opposite direction thereby balancing the fluid pressures, characterized in that they comprise compressible elastic means associated with the connecting means which are respectively compressed or expanded when the supply pressures of the two fluids increase or decrease respectively, so as to stabilize the pressure of the fluids.

The invention also provides a mixer assembly of the type described in which the connecting means comprises a beam, and which comprises first abutment means, in which the beam comprises in its central part second abutment means, the co-operation of the first and second abutment means limiting the displacement of the beam parallel to the axis of the escape valves and in the opening direction of the valve members, and in which the beam comprises additionally means which keep apart from the pivoting axis the pivot point of the force of the spring on the beam, in such a way that, when the first and second abutment means co-operate, the eccentric force of the spring being applied at the pivot point pushes the beam into a position where it ensures the complete closure of one of the valves.

Embodiments of the invention will now be described by way of example with reference to the accompanying drawings in which:

FIG. 3 is a section similar to that of FIG. 2 but of another embodiment of the invention in which a mixing chamber is incorporated; and, FIG. 4 is a diagram explaining the operation of the assembly of FIG. 1.

Figure 1:
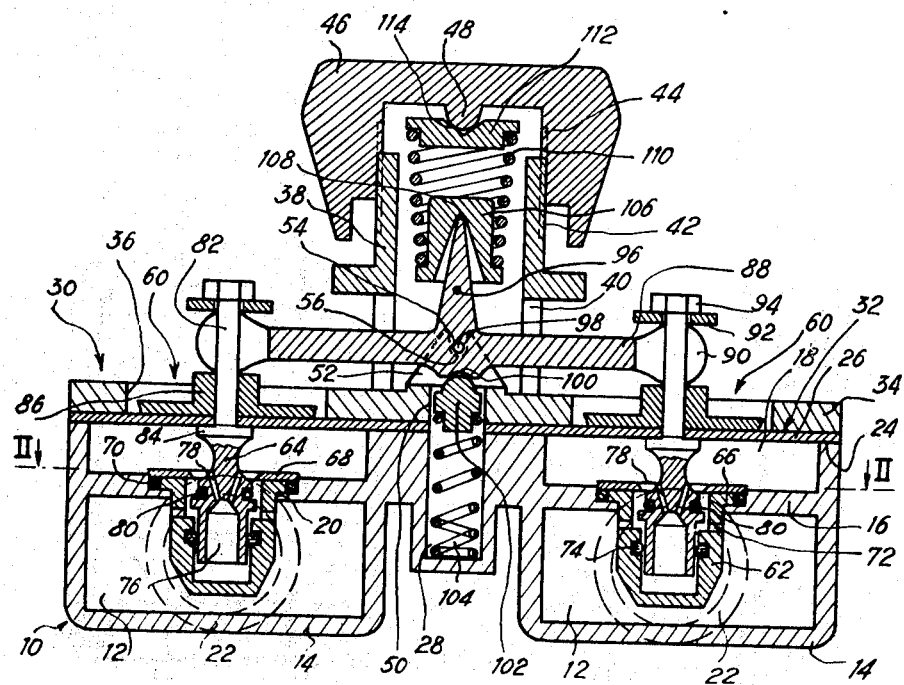
FIG. 1 is a section through the plane defined by the axes of the two escape valves of a mixer assembly according to the invention.

The assembly illustrated in FIG. 1 comprises a body 10, a frame 30 and escape valves 60.

The body 10 is symmetrical and comprises two identical chambers 12 each defined by a bottom 14 and a partition 16. The partition 16 also defines a space 18 adjacent the chamber 12 and is provided at its center with a threaded aperture 20. Each chamber 12 has a connection 22 for entry of a fluid under pressure. The upper side 24 of the body is flat and serves as a support for the membrane 26 common to the two escape valves. The part of the body 10 between the two chambers 12 has a blind bore 28, whose function is described below.

The frame 30 is fixed to the body 10 by screws (not shown) clamping the membrane 26 between the upper surface 24 of the body 10 and the lower surface 32 of the frame 30. The frame 30 comprises a lower flat part 34 provided with apertures 36 aligned with the apertures 20. The central part of the frame 30 supports a sleeve 38 in alignment with the bore 28 of the body 10. The sleeve 38 has two diametrically opposed apertures 40. In addition, the sleeve is threaded at its upper part 42 which engages with the lower threaded part 44 of a control handle 46. The handle 46 is formed internally with an axially disposed rounded pin 48.

The flat plate of the frame has at its center an aperture 50 which is in alignment, after mounting, with the bore 28 in the body 10. On either side of the aperture 50, the frame has two triangular protuberances 52 hollowed out by two grooves 54 limited by a base 56.

The escape valves 60 each comprise a valve body 62 and a valve member 64. The body 62 is held in the aperture 20 of the partition 16 by its flange 66 clamped between the partition 16 and a counter-plate 68 with the interposition of a fluid-tight seal 70.

The valve body 62 has apertures 72 which allow the chamber 12 to communicate with the interior of the body. The valve member 64 of the valve slides inside the body being guided by a seal 74 which ensures fluid-tightness between the space 76 within the valve member and which by means of the channels 78 is in communication with the expanded fluid, and the internal part of the valve body which contains the fluid before expansion.

The counter-plate 68 serves as a valve seating against which there abuts the seal 80 of the poppet valve in the closed position of the valve.

The valve member 64 is extended upwards by a rod 82 above a flange 84. The rod 82 of the valve member passes through the membrane 26. A disk 86 which surrounds the rod 82 clamps the membrane 26 against the flange 84 so as to make the valve member responsive to the displacements of the membrane.

The valve members of the two escape valves are connected by connecting means constituted by a beam 88. The ends 90 of the beam are fast with the valve members, being held between the disk 86 and a washer 92 held in position by a nut 94 screwed on to the end of the rod 82.

The beam has a central pointed projection 96, two pins 98 defining a pivoting axis perpendicular to the plane of the figure and co-operating with the grooves 54 of the frame, and a recess 100 at its lower part. This recess 100 may co-operate with a pin 10 2 guided in the aperture 50 and urged by a spring 104 housed in the blind bore 28.

The end of the projection 96 co-operates with a cup 106 at a pivot point 108. The cup 106 is pressed against the projection 96 by a spring 110 which abuts at its opposite end against a disk 112 which co-operates with the pin 48 by means of a conical cavity 114.

The apparatus which has just been described facilitates the balancing of the pressures of the two fluids, the stabilization of the outlet pressure and this is for any value of the outlet flow.

Thus, the rotation of the handle 46 causes it to move axially on the sleeve 38. Downward motion causes the descent of the pin 48 and compression of the spring 110. The latter transmits its force to the beam 88 which opens the valves by acting on the valve members.

When the upstream pressure of one of the fluids increases and the upstream pressure of the other fluid decreases simultaneously then since the total of the two fluid pressures remains constant, the beam pivots about the pivot point 98 so as to displace towards the opening position that valve member arranged in the fluid circuit whose pressure has decreased and to displace towards the closed position that valve member arranged in the fluid circuit whose pressure has increased, thereby maintaining the relationship between the pressures of the two expanded fluids constant.

When the pressure of one or of the two fluids varies in such a way that the total of the upstream pressures of the two fluids is not constant, on the one hand the beam pivots about the axis 98, as explained above, in order to keep the relationship between the pressures of the expanded fluids constant, and on the other hand the axis 98 is displaced on a path parallel to the axes of the escape valves either by compressing (if the total of the upstream pressures of the two fluids has increased) or by expanding (if the total of the upstream pressures of the two fluids has decreased) the spring 110, in order to bring the expanded pressure of the fluids to the value for which the mixer assembly is regulated (by screwing the handle 46 which compresses the spring 110).

In addition, the above-described apparatus comprises a safety device for completely shutting off entry of one of the fluids by closing the corresponding valve when the pressure of the other fluid tends to reduce. The operation of this safety device will be easily understood with reference to FIG. 4.

If it is assumed that the pressure in the right-hand chamber 12 has begun to drop, then the beam tends to pivot in a clockwise direction as seen in FIG. 4 under the effect of torque represented by the forces $F_s$. The spring 110 exerts its force on the point 108, which is represented by the force F. This force thus has a component $F_r$ which tends to turn the beam until the pivot axis 98 assumes a fixed position. The position is fixed when the axis defined by the pins 98 abuts against the base of the grooves 54 of the triangular protuberances 52. All the force of the spring 110 thus serves to pivot the beam abruptly towards a position where it completely closes the left-hand valve supplied with fluid under pressure.

In order to allow a complete closure of the valves when the handle 46 is unscrewed the opposing spring 104 permanently exerts a force tending to push the beam upwards.

Naturally, the operation has only been described for a particular variation of the pressures, but it is understood that the operation is similar when the pressures decrease instead of increase and vice versa.

Figure 2:
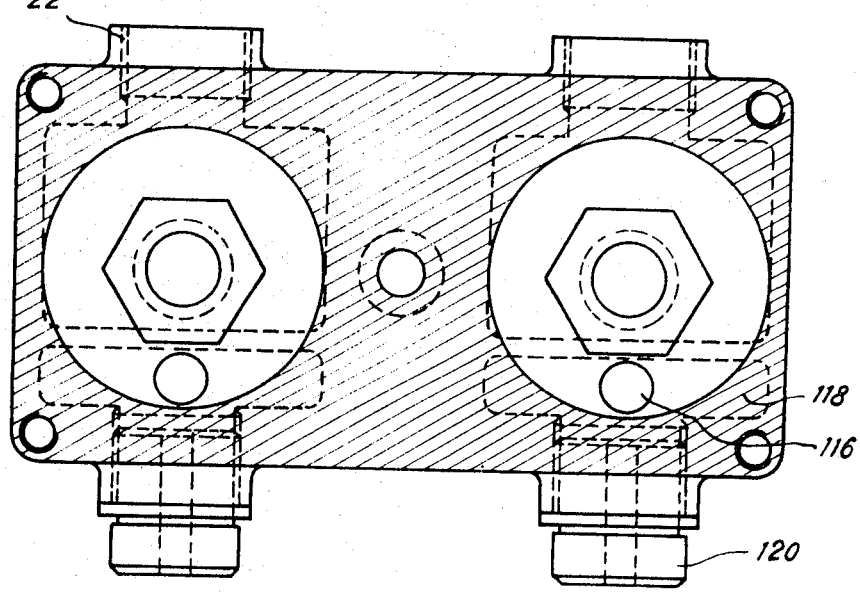
FIG. 2 is a section through the plane perpendicular to the section plane of FIG. 1, on the line II—II of FIG. 1.

FIG. 2 shows how the fluid inlets and outlets for the assembly of FIG. 1 are arranged in a mixing assembly with a remote mixing unit (not shown). The expanded fluid passes through an aperture 116 into an intermediary chamber 118 before being directed towards the mixer by a connection 120.

FIG. 3 shows a similar view to FIG. 2 of a variation incorporating a mixing chamber. The fluid inlet connections 22 are located on the sides and the expanded fluid leaves through an aperture 122 and passes through a calibrated poppet valve 124 before rejoining a mixing chamber 126 through a channel 128. The calibrated poppet valve 124 comprises a body 130 and a poppet valve 132 held in the closed position by a spring 134, the force of which may be adjusted by screwing or unscrewing a head 136.

The advantage of having a calibrated poppet valve at the outlet of each of the escape valves is that the two escape valves always operate at a minimum pressure making it possible to maintain the relationship between the expanded pressures even for slight flows.

The above description has been given as an example. It is obvious for a man skilled in the art that numerous modifications may be applied made without departing from the scope of the invention. In particular, the co-operation of the ends of the beam with each of the two poppet valves may be obtained by numerous other pivots, comprising in particular a blade co-operating with a V-shaped groove, or a point with a rounded end co-operating with a cavity of concave shape, in particular conical.

What is claimed is:

1. A mixer assembly for mixing two separate fluids under pressure, comprising:
   a. a body having two separate inlet chambers,
   b. means for introducing one of the fluids into one of said inlet chambers and the other fluid into the other of said inlet chambers,
   c. two separate outlet chambers in said body,
   d. means for directing fluid from said outlet chambers to a mixing chamber wherein the two fluids are mixed,
   e. an escape valve for controlling fluid flow between each inlet chamber and a different one of said outlet chambers, each escape valve including a valve body between each inlet chamber and its respective outlet chamber and a valve member movable with respect to said valve body between an open and a closed position,
   f. a membrane movable in response to fluid pressure in each of said outlet chambers,
   g. means operatively connecting each membrane to the valve member associated with its respective outlet chamber for biasing said valve member toward its closed position in response to increased fluid pressure in the outlet chamber with which it is associated,
   h. a beam secured at each of its ends to a different one of said valve members,
   i. means fixed with respect to said body defining a fulcrum for said beam,
   j. relatively strong resilient means applying a force to an intermediate point on said beam for urging said beam in a direction tending to move said valve members to their open positions,
   k. means for varying the force applied by said resilient means to said beam, and
   l. relatively weak resilient means located outside said chambers and applying a force to said intermediate point on said beam in alignment with, but opposite in direction to, the force applied by said relatively strong resilient means.

2. A mixer assembly as defined in claim 1, including means for limiting the movement of said beam in the direction in which said relatively strong resilient force is applied to said beam.

3. A mixer assembly as defined in claim 2 wherein said limiting means includes means defining a pivot axis at said intermediate point on said beam, and means stationary with respect to said chambers defining groove means for accommodating said pivot axis means, said groove means having a bottom toward which said relatively strong resilient means urges said pivot axis means.

4. A mixer assembly as defined in claim 3 wherein said relatively strong resilient means engages said intermediate point of said beam at a location spaced from said pivot axis, whereby upon substantial pivotal displacement of said beam in one direction due to loss of pressure in one of said outlet chambers, said relatively strong resilient means produces a torque urging said beam in said one direction so as to bias said valve member associated with the other of said outlet chambers to its closed position.

5. A mixer assembly as defined in claim 3 including means for equalizing the pressure on both sides of each of said valve members.

6. A mixer assembly as defined in claim 1, including a spring-loaded valve for controlling the flow of fluid out of each of said outlet chambers so as to maintain a predetermined pressure in each of said outlet chambers.

7. A mixer assembly as defined in claim 6 including means for adjusting the spring forces of each of said spring-loaded valves so as to adjust said predetermined pressure in each of said outlet chambers.

* * * * *